United States Patent
Weyant et al.

[15] 3,675,800
[45] July 11, 1972

[54] VEHICLE CARRIER

[72] Inventors: Romer G. Weyant, 81 Edgewater Drive, Elkhart, Ind. 46514; Kenneth B. Kaar, 1821 N. Street, Lincoln, Nebr. 68110

[22] Filed: Nov. 4, 1970

[21] Appl. No.: 86,805

[52] U.S. Cl. ............................................. 214/85.1, 296/61
[51] Int. Cl. ........................................................ B60p 1/44
[58] Field of Search .................... 214/85, 85.1, 77 R, 77 P; 296/61

[56] References Cited

UNITED STATES PATENTS

| 3,142,394 | 7/1964 | Schwartz | 214/85 |
| 3,051,340 | 8/1962 | Ely | 214/85 X |
| 2,486,189 | 10/1949 | McCormick | 214/85.1 |
| 2,739,719 | 3/1956 | Mackaness et al. | 214/77 R |
| 3,516,560 | 6/1970 | Brighton | 214/85 |
| 3,375,946 | 4/1968 | Drake | 214/505 |

*Primary Examiner*—Albert J. Makay
*Attorney*—Olsen and Stephenson

[57] ABSTRACT

A truck for hauling a disabled motor vehicle or the like. The truck has a flat bed and a ramp on which the vehicle can be supported, and the ramp may be lowered for loading and unloading purposes. Hydraulic cylinders are provided for raising and lowering the ramp, and a winch is mounted on the truck for pulling the disabled vehicle up the ramp to a loaded position.

1 Claim, 4 Drawing Figures

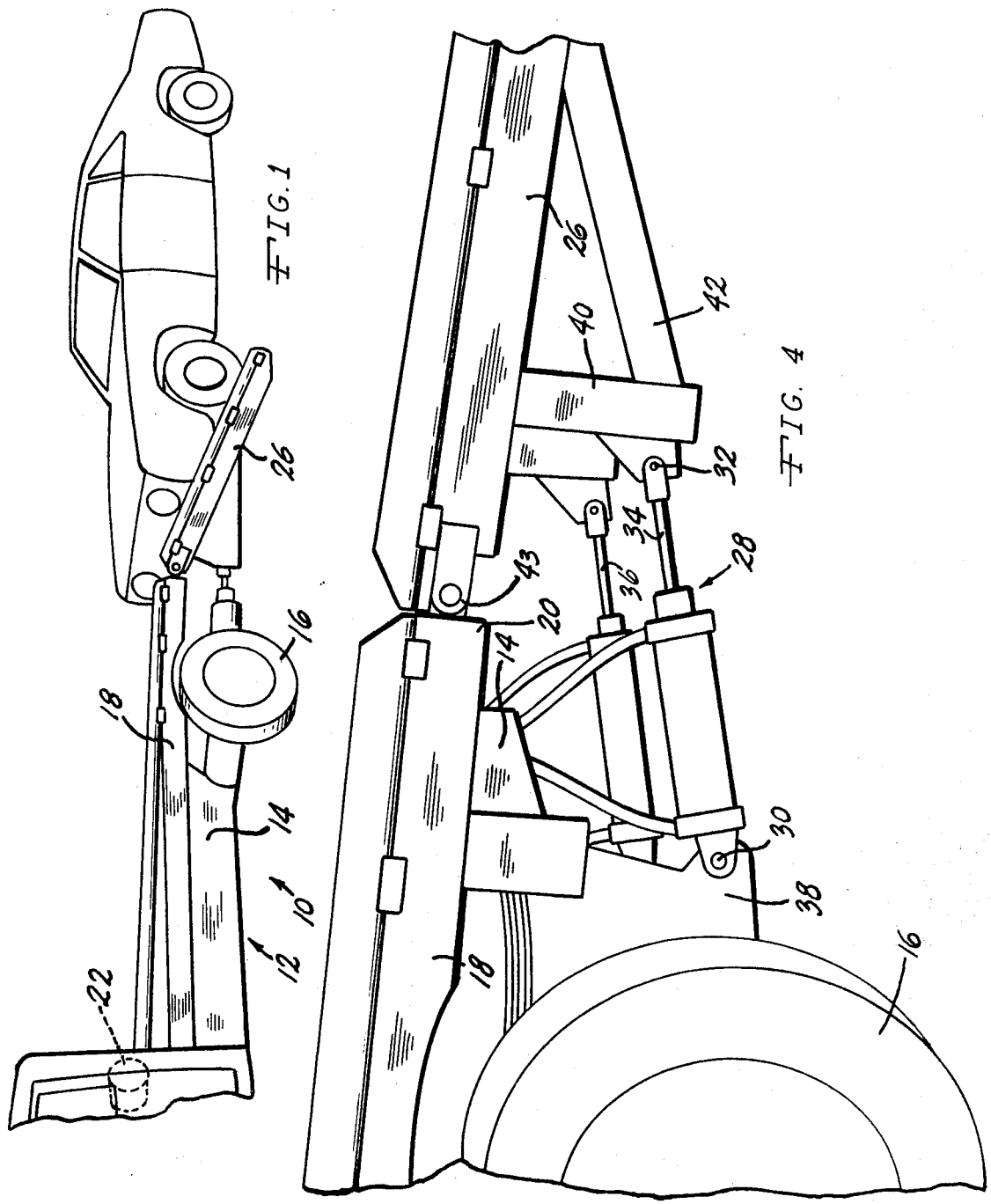

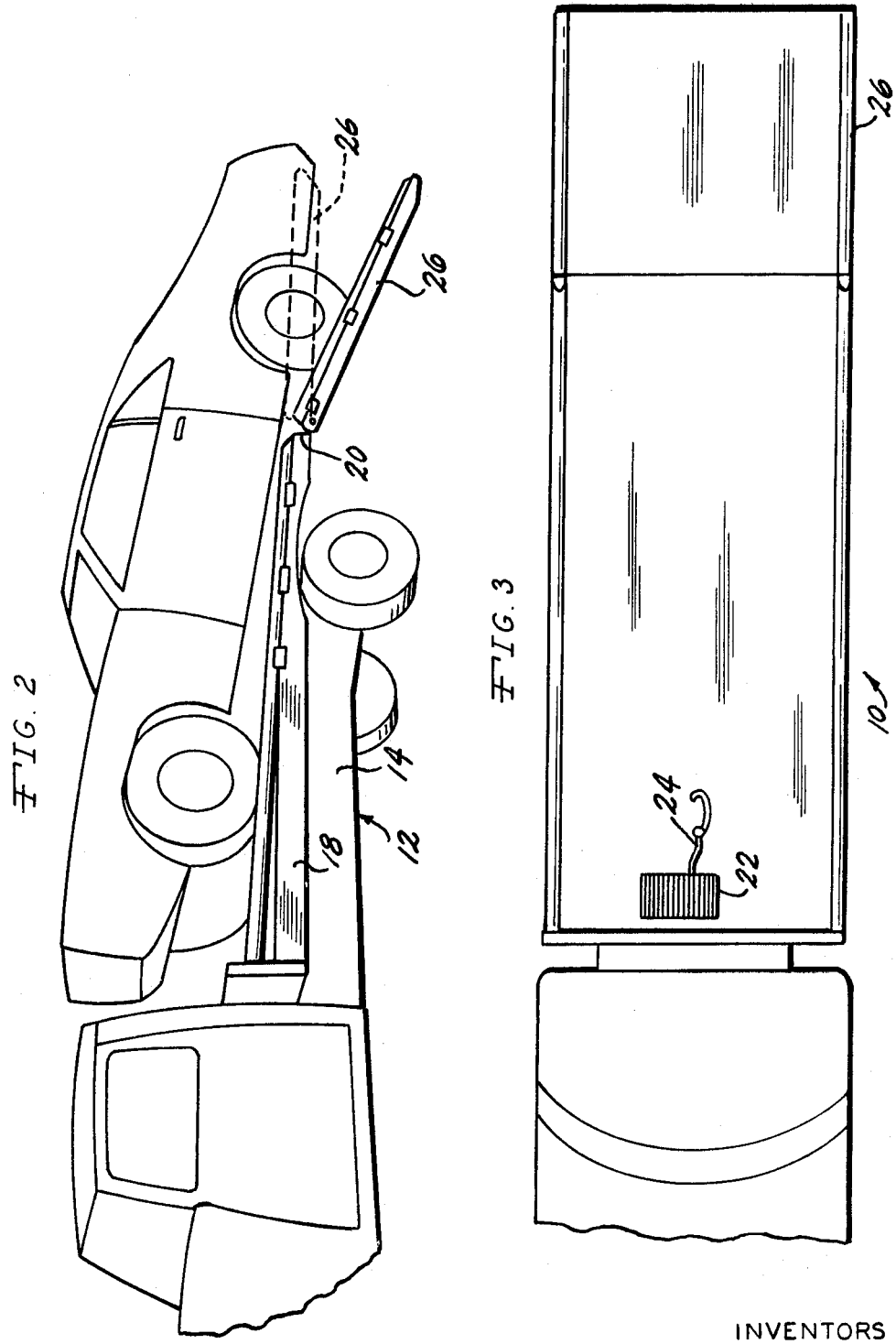

VEHICLE CARRIER

BACKGROUND OF THE INVENTION

The present invention relates to a vehicle carrier that can be used to haul automobiles, house or camping trailers, and the like, and it is particularly adapted for hauling disabled motor vehicles. It is conventional practice to haul disabled motor vehicles with tow trucks which have a winch mounted at the rear for lifting one end of the disabled vehicle so that it can be pulled on its wheels at the other end. For several reasons, this practice leaves much to be desired.

Not infrequently, the disabled vehicle has been in an accident in which both front and rear wheels are damaged so that it cannot be towed. However, of greater significance is the frequency that the disabled vehicle is further damaged as a result of the towing operation. Such damage to the towed vehicle may occur to the end of the vehicle that is lifted by the winch, or it may be the result of conditions that occur during the towing of the vehicle. Most of the motor vehicles that are on the market today have at both ends a relatively long overhang of the frame beyond the axle shafts. When one end of the vehicle is lifted, the other end of the vehicle is necessarily lowered relatively close to the supporting road surface. Frequently, the towed vehicle is damaged while being towed because the lowered end of the motor vehicle will strike the road surface if the latter has irregular contours. Damages caused in this manner may even exceed the original damage that disabled the vehicle.

SUMMARY OF THE INVENTION

The present invention has overcome the shortcomings of the prior art and provides a vehicle carrier which is constructed and arranged so that the disabled vehicle can be pulled onto a supporting surface of the carrier for hauling to the desired destination.

According to a preferred form of the present invention, a vehicle carrier is provided comprising a frame which is supported on front and rear wheels. A flat bed is mounted on the frame and projects rearwardly of the rear wheels, and a ramp is pivotally connected to the rear edge of the flat bed and is movable between a loading position in which the remote end thereof is on the wheel supporting surface and a vehicle carrying position in which the remote end is pivoted to a position above the plane of the flat bed. A winch is mounted on the frame at the forward end of the flat bed for use with a cable to pull the vehicle onto the ramp and flat bed when the ramp is in its loading position. A pair of hydraulic cylinders are pivotally connected at their opposite ends to the frame and to the underside of the ramp for moving the ramp from its loading position to its supporting position. Each of the hydraulic cylinders is pivotally connected at one end to the frame at a location spaced below the flat bed and at the other end to the ramp at a location spaced below the undersurface of the ramp and adjacent to the forward edge of the ramp. Mounting struts are mounted on the undersurface of the ramp and extend in axial alignment with the hydraulic cylinders from the locations of pivotal connections with the cylinders with the ramp to rearward locations of rigid connection of the struts with the undersurface of the ramp. Thus, the disabled motor vehicle can be readily pulled onto the ramp and onto the flat bed, after which the ramp, which still supports the rear end of the disabled vehicle can be elevated and locked into position by action of the hydraulic cylinders. The disabled vehicle can then readily be moved to a desired location.

While the vehicle carrier is primarily intended for use in hauling disabled motor vehicles, it can be used to haul any other type of vehicle, such as house trailers, camping trailers and the like.

Accordingly, it is one of the objects of the present invention to provide an improved vehicle carrier.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a side elevational view of a vehicle carrier embodying the present invention, showing the ramp in its lower or loading position;

FIG. 2 is a side elevational view similar to that of FIG. 1 showing in outline a motor vehicle which has been moved onto the flat bed by the winch, and showing in phantom lines the position of the ramp in its loaded or upper position;

FIG. 3 is a top plan view of the illustrated embodiment of the invention, showing the ramp in its upper position; and FIG. 4 is an enlarged fragmentary side elevational view showing details of the hydraulic cylinder means for moving the ramp between its upper and lower positions.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The vehicle carrier 10 includes a conventional truck chassis 12 having a frame 14 supported by front and rear wheel assemblies, only the rear wheel assembly 16 being shown. Mounted on the frame 14 is a flat bed 18 which projects rearwardly beyond the rear wheel assembly 16, terminating at the rear edge 20. Also mounted on the frame in a suitable manner is a winch 22 which is located adjacent to the forward end of the flat bed 18, and which is adapted to support a cable 24 for pulling a motor vehicle onto the flat bed 18 in a manner to be described.

Connected to the rear edge 20 of the flat bed 18 is a ramp 26 which has its forward edge hingedly or pivotally connected to the rear edge 20. The ramp 26 is adapted to be moved between the lower or loading position shown in solid lines in FIGS. 1 and 2, and the upper or vehicle supporting position shown in broken lines in FIG. 2.

Hydraulic cylinder means 28 are connected at one end to the frame 14 at the pivot pin 30, and at the other end to the underside of the ramp 26 at the pivot pin 32. In the illustrated embodiment of the invention a pair of parallel-disposed hydraulic cylinders 34 and 36 are provided for this purpose. Also, the pivot pin 30 is supported by the support bracket 38 at a location spaced below the flat bed 18, and the pivot pin 32 is supported by the bracket 40 and the strut 42 at a location spaced below the undersurface of the ramp 26 and adjacent to the forward edge 43. It will be noted that the struts 42 are each in axial alignment with its corresponding hydraulic cylinder 34 or 36, and then are rigidly secured adjacent to the remote or distal end of the ramp 26 at the undersurface thereof.

By virtue of the construction and arrangement described, when the ramp 26 is in its lower position, a motor vehicle can be pulled by the winch 22 to the position shown in FIG. 2, after which the hydraulic cylinders 34 and 36 can be actuated to pivot the ramp 26 to the elevated position shown by the phantom lines in FIG. 2. The vehicle will then be supported by the flat bed 18 and ramp 26, and the free end of the latter will be in a position above the plane of the flat bed 18 to aid in holding the vehicle in place on the vehicle carrier 10.

From the foregoing description it will be readily understood that the vehicle carrier 10 can be used to haul any type of mobile vehicle or it can be used to haul a vehicle which has been damaged in an accident in such a manner that neither its front wheels or its rear wheels are suitable for hauling purposes. The winch 22 can pull the damaged vehicle up the ramp and into place on the flat bed after which the ramp 26 can be elevated and the damaged vehicle can then be hauled to a desired destination.

It is claimed:

1. A vehicle carrier comprising a frame, front and rear wheels supporting the frame, a flat bed supported on the frame and projecting rearwardly of the rear wheels, a ramp pivotally connected at its forward edge to the rear edge of said flat bed and movable between a loading position in which the distal end thereof is on the supporting surface for said wheels and a vehicle-carrying position in which the distal end thereof is above the plane of said flat bed, a winch mounted on said frame at the forward end of said flate bed for use with a cable to pull a vehicle onto said ramp and flat bed when the ramp is in its loading position, a pair of hydraulic cylinders pivotally connected at their opposite ends to said frame and to the underside of said ramp for moving said ramp from its loading position to its vehicle-supporting position, each of said hydraulic cylinders being pivotally connected at one end to said frame at a location spaced below said flat bed and at the other end to said ramp at a location spaced below the undersurface of the ramp and adjacent to said forward edge, the pivotal connection of the hydraulic cylinders at said one end being spaced a greater distance below said flat bed than the pivotal connection of the other end of the hydraulic cylinders is spaced below the undersurface of said ramp, and struts mounted on the undersurface of the ramp and extending in axial alignment with said hydraulic cylinders from the locations of pivotal connections of the cylinders with the ramp to rearward locations of rigid connection of the struts with the undersurface of the ramp.

* * * * *